(No Model.)

H. M. PRESTON.
DRILL CHUCK.

No. 383,248. Patented May 22, 1888.

Witnesses:
Chas. B. Shumway
M. S. Seeley

Inventor.
Henry M. Preston,
By George D. Seymour,
Atty.

UNITED STATES PATENT OFFICE.

HENRY M. PRESTON, OF NEW HAVEN, CONNECTICUT, ASSIGNOR TO ELLWOOD BURDSALL, OF PORT CHESTER, NEW YORK.

DRILL-CHUCK.

SPECIFICATION forming part of Letters Patent No. 383,248, dated May 22, 1888.

Application filed February 28, 1888. Serial No. 265,594. (No model.)

*To all whom it may concern:*

Be it known that I, HENRY M. PRESTON, residing at New Haven, in the county of New Haven and State of Connecticut, have invented certain new and useful Improvements in Drill-Chucks; and I do declare the following to be a full, clear, and exact description of the same, reference being had to the accompanying drawings, which form a part of this specification.

My invention relates to an improvement in drill-chucks, the object being to make them more efficient and durable.

With this end in view my invention consists in a holding device located behind the jaws of a drill-chuck and adapted to hold a drill by the extreme end thereof, so as to permit it to be moved and centered by the chuck-jaws.

My invention further consists in certain details of construction and combinations of parts, as will be hereinafter described, and pointed out in the claims.

Figure 1:
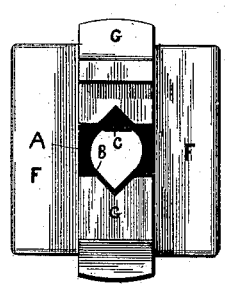
Figure 2:
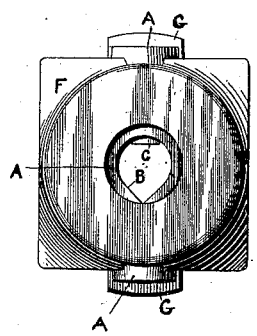
Figure 3:
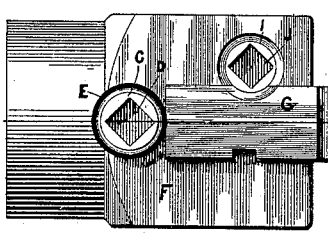
Figure 4:
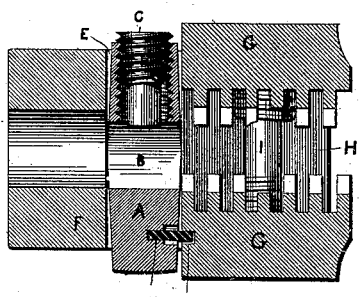
Figure 5:
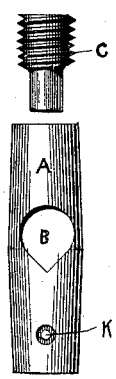

In the accompanying drawings, Figure 1 is a view in front elevation of a chuck embodying my invention. Fig. 2 is a similar rear view thereof. Fig. 3 is a plan view of the chuck. Fig. 4 is a view of the chuck in vertical longitudinal section on the line $a\,b$ of Fig. 3, and Fig. 5 is a detached view in front elevation of the movable holding device.

As herein shown, my invention consists in a circular dog, A, tapering each way from its center to its ends, having a transverse opening, B, located midway of its length and bored out and interiorly threaded at one end to receive a set-screw, C, adapted to enter the opening aforesaid, and provided at its outer end with a key-hole, D, for the application of a key or wrench whereby it is operated. This dog is located in a chamber, E, extending transversely across the shell F of the chuck, situated directly behind the jaws G G thereof and opening into the chamber or space H, containing such jaws, which are simultaneously advanced and retracted by an operating-screw, I, having its respective ends oppositely threaded and provided at one end with a key-hole, J, as shown. The forward face of the dog is provided with a projecting pin, K, which enters a recess, L, formed in the rear edge of the adjacent chuck-jaw G and made sufficiently large to permit the pin to play in it within narrow limits. This forms a flexible coupling, whereby the dog and jaws are operated together and the alignment of the opening in the dog with the opening between the jaws facilitated.

Under the construction described the dog has a capacity for universal movement in its chamber, so that it responds to the jaws and permits them to accurately center a drill, while at the same time it grips the drill and holds it from twisting. It will be noted that the dog, being arranged to grip the extreme end of the drill, will not spring it, nor will it deface it.

In using my improved chuck the jaws are operated so as to permit the end of the drill to be slipped between them and introduced into the opening of the dog, the set-screw whereof is then screwed down upon it. The operating-screw is then turned to advance the jaws upon the drill, which they center accurately without assuming the burden of holding it against twisting. My invention therefore relieves the jaws of all hard usage, and so prolongs the life of the tool. If desired, the dog may be removed and the chuck used without it, as may be convenient in some classes of work for which the chucks are applicable.

It is apparent that in carrying out my invention some changes in the form herein shown and described may be made. I would therefore have it understood that I do not limit myself to such form, but hold myself at liberty to make such alterations as fairly fall within the spirit and scope of my invention.

Having fully described my invention, what I claim as new, and desire to secure by Letters Patent, is—

1. A drill-chuck provided with an independent adjustable holding device adapted to move with the drill, to permit the same to be centered by the chuck-jaws after it has been clamped upon the drill, substantially as set forth.

2. A drill-chuck provided with a dog located behind its jaws in a chamber in which it is movable, so as to permit it to respond to the jaws in centering the drill held by it, substantially as set forth.

3. A drill-chuck having a holding device located behind its jaws, flexibly coupled with one of them, and adapted to grip and hold a drill by the end thereof and to move to permit the drill to be centered by the chuck-jaws, substantially as set forth.

4. A drill-chuck provided with an independent clamping-dog having an opening between its ends, furnished with a set-screw, located in a chamber behind the chuck-jaws, and adapted to be moved so as to permit the drill to be centered by the said jaws while it is held against twisting by the dog, substantially as set forth.

5. A drill-chuck provided with a tapering circular dog having an opening between its ends, and furnished with a set-screw, located in a chamber situated behind the chuck-jaws, and adapted to be moved so as to permit the drill to be centered by such jaws while it is held against twisting by the dog, substantially as set forth.

In testimony whereof I have signed this specification in the presence of two subscribing witnesses.

HENRY M. PRESTON.

Witnesses:
CHAS. B. SHUMWAY,
M. S. SEELEY.